United States Patent [19]

Morris et al.

[11] 4,026,458
[45] May 31, 1977

[54] DEEP DRAWN PAPERBOARD CONTAINER AND PROCESS FOR MAKING IT

[75] Inventors: Jerald A. Morris, Marion, Ind.; John C. Siegele, New City, N.Y.

[73] Assignee: International Paper Company, New York, N.Y.

[22] Filed: Mar. 27, 1975

[21] Appl. No.: 562,810

[52] U.S. Cl. .................. 229/30; 229/2.5 R; 229/14 BL; 93/36 M; 93/36 PC; 53/3
[51] Int. Cl.² .......................................... B65D 5/20
[58] Field of Search ............ 229/14 BL, 2.5, 30, 229/31 R, 3.5 R; 93/36 M, 36 PC; 53/3

[56] References Cited

UNITED STATES PATENTS

| 2,750,075 | 6/1956 | Land et al. ............ 206/484 |
| 2,975,074 | 3/1961 | Janken et al. ............ 229/3.5 R |
| 2,997,927 | 8/1961 | Carson ............ 93/36 |
| 3,033,434 | 5/1962 | Carson ............ 229/2.5 |
| 3,058,645 | 10/1962 | Luterick ............ 229/3.5 R |
| 3,468,468 | 9/1969 | Foote ............ 229/14 BL |
| 3,556,816 | 1/1971 | Nughes ............ 206/484 |
| 3,687,351 | 8/1972 | Kaercher et al. ............ 229/3.5 MF |
| 3,750,907 | 8/1973 | Steele ............ 206/484 |

Primary Examiner—Stephen P. Garb
Assistant Examiner—Joseph Man-Fu Moy
Attorney, Agent, or Firm—Richard M. Barnes; Alfred L. Michaelsen

[57] ABSTRACT

Disclosed is a deep drawn paperboard container and a process for making it. The container has an inner wall comprising a water impermeable layer coated on a specific paperboard substrate. The deep drawn container is greater than about 1.375 inches deep, has a radius of curvature of its bottom corners of less than about ⅞ inches and an angle of inclination of its side walls of less than about 20° from the vertical.

14 Claims, 4 Drawing Figures

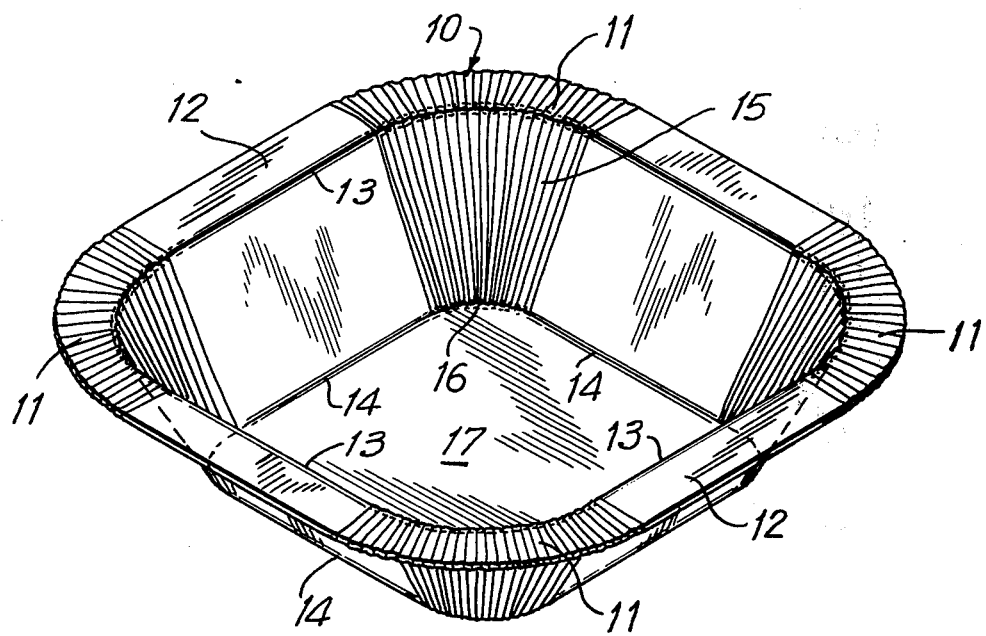

U.S. Patent May 31, 1977 Sheet 3 of 3 4,026,458
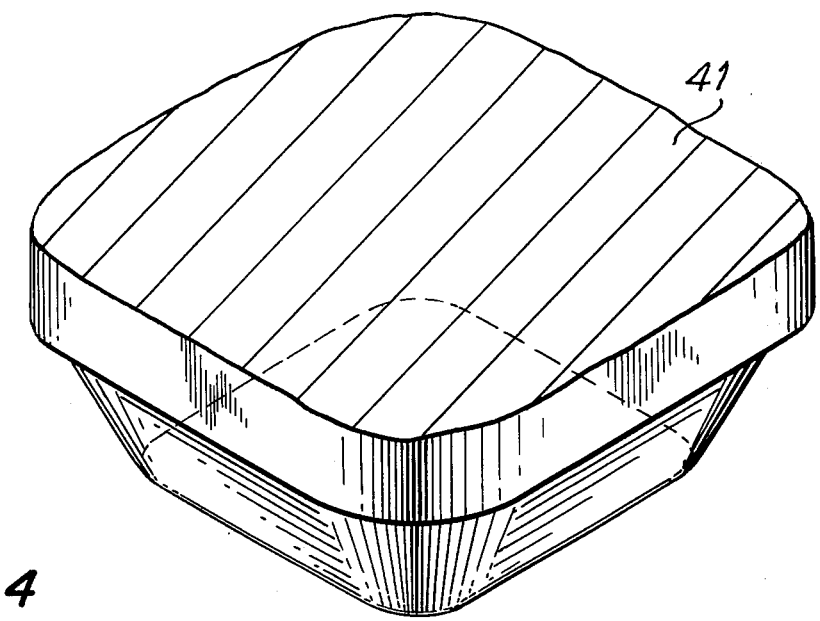
FIG. 4
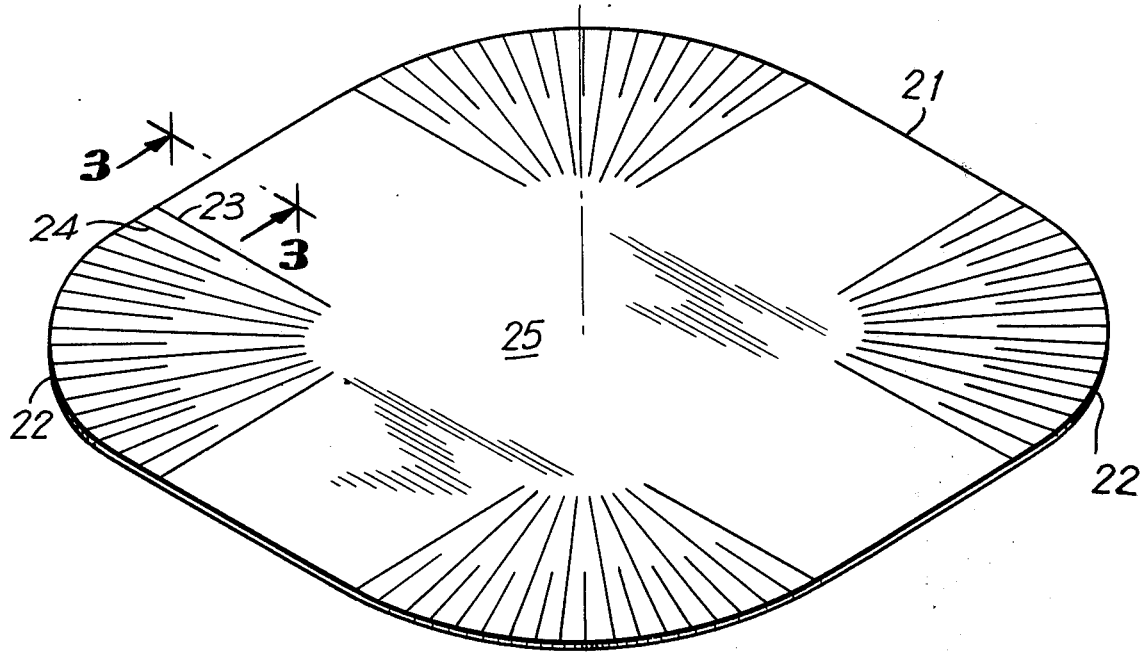
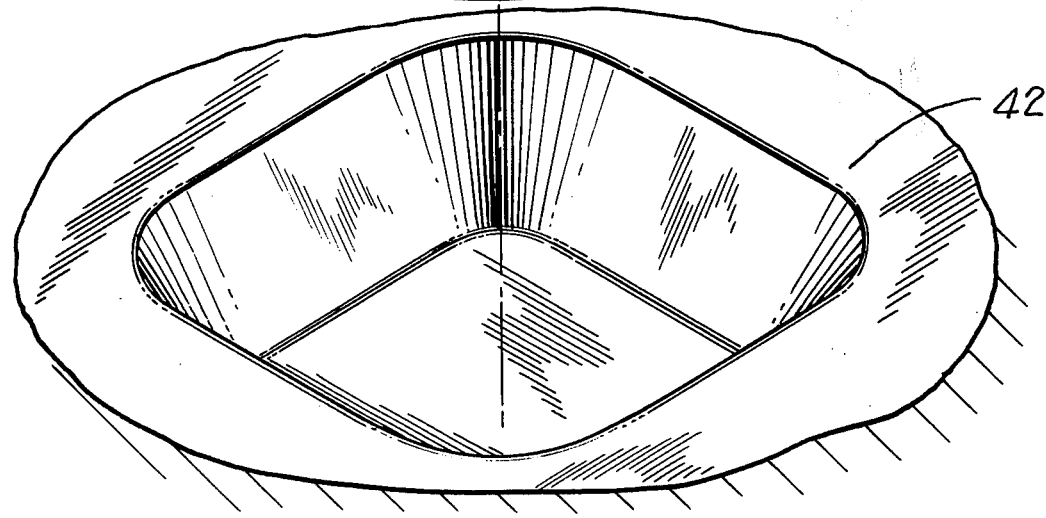

DEEP DRAWN PAPERBOARD CONTAINER AND PROCESS FOR MAKING IT

BACKGROUND OF THE INVENTION

1. Field to Which the Invention Pertains

It is old in the art to deep draw paperboard into containers for food. However, there has hitherto been restrictions on the type of containers that could be produced by known processes. These restrictions have existed since the prior art processes have not enabled the production of certain types of containers without substantial tearing of the paperboard substrate, particularly at the rounded edges of the deep drawn containers. Specifically, it has hitherto been thought that containers with a depth greater than about 1.375 inches a radius of curvature of its bottom corners of less than about ⅞ inch and sidewalls with an angle of inclination of less than about 20° from vertical could not be obtained by a deep drawing operation without substantial tearing of the paperboard substrate.

The tearing problem associated with deep drawing a paperboard blank to a depth greater than about 1.375 inches is particularly acute when the radius of curvature is less than about ⅝ inch and the sidewalls are less than about 17° from the vertical.

The tearing associated with drawing operations was referred to in U.S. Pat. No. 2,270,185 to Dulmage. Specifically, the Dulmage patent teaches drawing thermoplastic blanks which may contain paper spacer sheets. The patent teaches that the paper spacer sheets sometimes tend to rupture under the stress of the drawing operation.

The above noted restrictions on prior art deep drawn containers have been particularly disadvantageous since such containers are most desired for use as containers for food. One reason why these containers are so desired is that they have a relatively large volume for the amount of storage space required for the container. Additionally, since the corners of such containers are essentially square the containers may be stored with other such containers, i.e., on grocery shelves, with a minimum amount of wasted void space between adjoining containers.

Additionally, deep drawn containers have advantages over other prior art containers which require separate folding steps and external fastening or bonding means such as described in U.S. Pat. No. 3,511,140 to Hoyrup. Specifically, deep drawing processes do not require multiple steps, and the containers produced do not contain potential sites of weakness at the fastening or bonding sites. It, therefore, would be particularly advantageous to provide deep drawn containers which have a relatively large volume while requiring a minimum amount of storage space.

The invention disclosed herein relates to deep drawn paperboard containers having a depth greater than about 1.375 inches; a bottom with a radius of curvature less than about ⅞ inch and, preferably, less than about ⅝ inch and rounded sidewalls with an angle of inclination less than about 20° from vertical and, preferably, less than about 17 degrees from the vertical.

Description of the Prior Art

The most pertinent prior art of which we are aware are U.S. Pat. Nos. 3,033,434 and 2,997,927 to Carson. The Carson patents teach a plurality of different types of dishes which have been drawn from scored blanks into the desired shape. The '434 patent teaches that the blanks may be made from a broad range of materials including fiber paper, aluminum and foldable plastics.

The Carson patents do not teach that the paperboard containers described above may not be produced from most types of paperboard without substantial tearing of the paperboard substrate. Additionally, the Carson patents do not teach the specific type of paperboard product employed in the present invention to obviate the above described tearing problems associated with deep drawing the paperboard containers of the present invention.

The invention disclosed herein relates to deep drawing a specific type of paperboard into particular types of paperboard containers.

SUMMARY OF THE INVENTION

A paperboard substrate is coated on one surface thereof with a thin layer of water impermeable material. Preferably, the coating material is also grease impermeable. The coated side of the paperboard blank is radially scored along its curved corners to provide a paperboard blank.

The paperboard substrate employed is made from bleached virgin sulfate or sulphite pulp or mixtures thereof. The thickness of the paperboard substrate is at least about 15 caliper and, preferably, about 15 caliper to 30 caliper. The basis weight is broadly about 50 lbs/1000 sq. ft. to 110 lbs/1000 sq/ft. and, preferably, about 52 lbs/1000 sq. ft. to 108 lbs/1000 sq. ft. The tensile strength is 70 to 190 lbs/in. in the machine directions and 40 to 100 lbs/in. in the cross direction. The Taber V-5 stiffness is about 100 to 780 Taber units in the machine direction, and about 50 to 350 Taber Units in the cross direction. All the above paperboard characteristics are determined by standard tests well known to those skilled in the art.

The paperboard blank is positioned between a male mandrel and a female mold so that the coated and scored surface of the blank faces the male mandrel. The male mandrel and female mold are positioned so that the male mandrel may engage the female mold to draw the blank into the female mold thereby forming a paperboard container. The male mandrel and the female mold are designed to form a coated paperboard container greater than about 1.375 inches deep, having a radius of curvature at its bottom of less than ⅞ inch and, preferably, less than ⅝ inch, and having an angle of inclination of less than about 20° and, preferably, less than 17° from the vertical.

The male mandrel or the female mold or preferably both, are heated so that the blank is exposed to a temperature of at least about 200° F. When the blank is coated with polyethylene, the male mandrel is maintained below about 195° F. and the female mold is preferably maintained between about 200° to 350° F. The application of heat to the paperboard blank in the molding apparatus, as described above, sets the paperboard container so that it will not return or "pop back" to its original flat state when it is removed from the mold.

In the most preferred embodiment of the present invention, the male mandrel and female mold are chromium plated. The chromium plating serves to reduce the friction between the paperboard blank and the mold and mandrel thereby minimizng the possibility of tearing during the drawing operation.

BRIEF DESCRIPTION OF THE DRAWINGS

FIG. 1 is a perspective view of a paperboard container of one embodiment of the present invention.

FIG. 3 is a cross sectional view of an unscored portion of the paperboard blanks used in one emobdiment of the present invention.

FIG. 4 shows the relationship of male mandrel, paperboard blank, and female mold prior to drawing the blank into a container according to the present invention.

DESCRIPTION OF THE PREFERRED EMBODIMENTS

Figure 2:
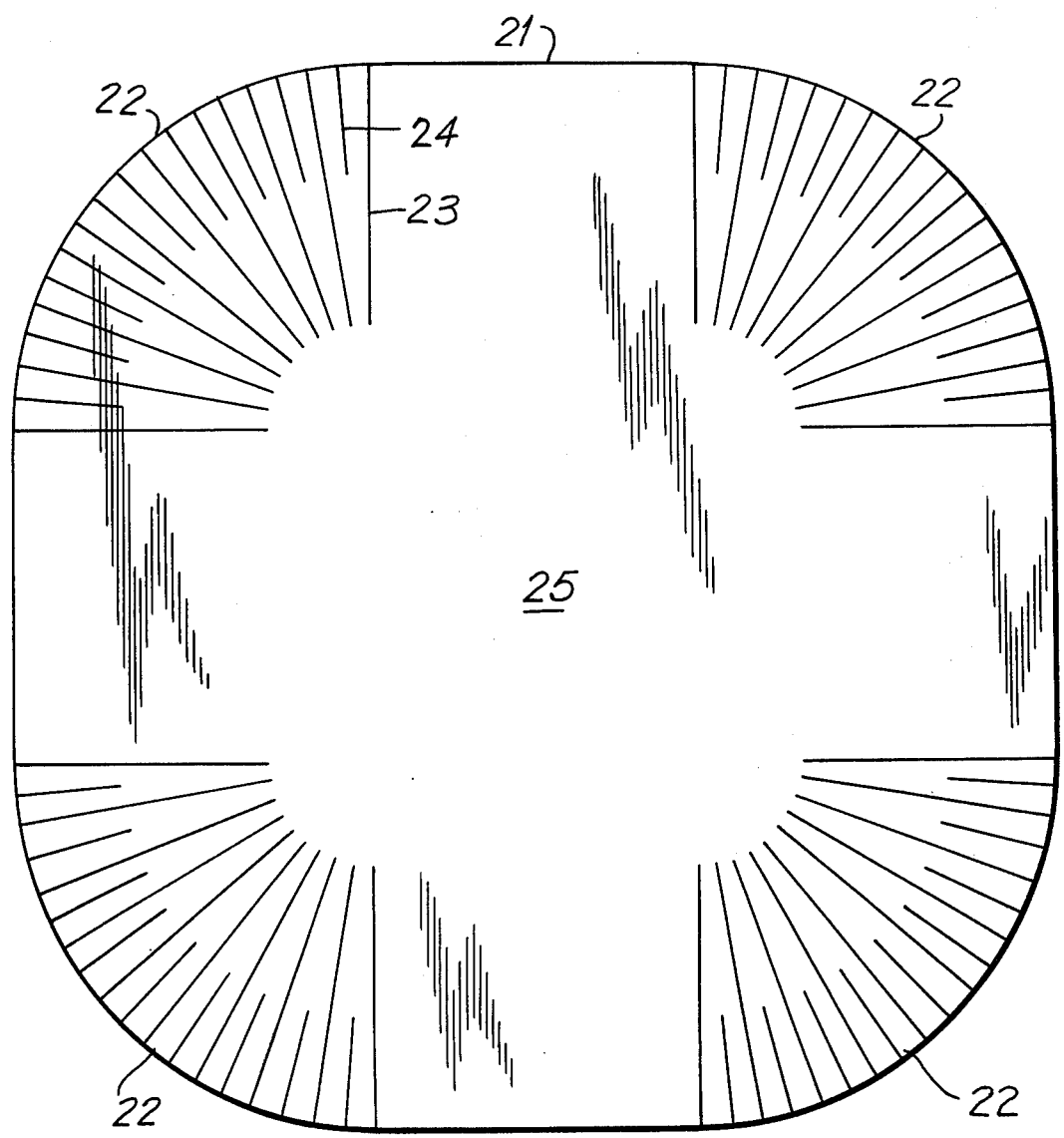
FIG. 2 is a paperboard blank used in one embodiment of our invention.

Referring now to FIG. 1, there is shown a paperboard container 10 according to one embodiment of the present invention. As will be appreciated upon reference to FIG. 1, the container 10 of this embodiment is substantially square with rounded corners 11. The container 10, as shown, has overhanging lips 12, but it is to be understood that containers without overhanging lips are contemplated as within the scope of the invention. The container 10 is greater than about 1.375 inches deep. By greater than about 1.375 inches deep it is meant that the shortest distance between the planar surfaces defined by upper edges 13 and lower edges 14 of the container is greater than about 1.375 inches.

Additionally, the rounded corners 16 of the lower surface 17 of the container have a radius of curvature of less than about ⅞ inch and preferably less than ⅝ inch. It is preferred that the rounded corners are circular and are all the same radius, but this need not be the case. When the rounded corners are not circular or the corners are all not the same radius, the radius of curvature of the rounded corners 16 is less than a given dimension, e.g. ⅝ inch, if any portion of the arcs defining the rounded corners has a radius of curvature of less than ⅝ inch.

The inner walls 18 of the containers of the present invention have an angle of inclination from the vertical of less than 20° degrees and preferably less than 17°. It is to be understood that while the angle of inclination is preferably constant, it may vary between the straight inner walls or around the rounded inner walls. In these cases, for the purposes of this invention the angle of inclination of the inner walls is less than a given amount, e.g. 20°, from the vertical if any portion of the inner walls has an angle of inclination of less than 20° from the vertical.

It will be observed that the corners 11 of the container 10 contain pleated folds 15. As will be explained below the pleated folds 15 occur along lines scored in the paperboard blank before it was drawn into the container.

Referring now to FIG. 2, there is shown the paperboard blank 21 from which the paperboard container of FIG. 1 is produced. The paperboard blank 21, as shown, is substantially square, although other configurations, i.e., rectangular or circular, may be employed within the scope of the invention. The surface 25 is the surface which faces the male mandrel in a later described drawing operation. In addition, as will also be later described, the surface 25 of blank 21 is coated with a thin layer of water impermeable material. The outer portion of the rounded corners 22 contain spaced radial long score lines 23 and short score lines 24 in alternating sequence. The score lines 23 and 24 are provided and arranged so that in a later described drawing operation excess paper will flow into the small increments defined by the score lines so as to provide relatively smooth pleated folds 15. Radial scoring and pleated folds such as contemplated in the present invention are described in the earlier mentioned U.S. Pat. Nos. 3,033,434 and 2,997,927 to Carson which disclosures are incorporated herein as reference. As shown in FIG. 2, it is preferred that the scorelines alternate between long and short. However, it is to be understood that the score lines of the present invention may be of uniform length.

Referring now to FIG. 3, there is shown a cross sectional view of an unscored portion of the paperboard blanks used in one embodiment of the present invention. Specifically, there is shown a paperboard substrate 31 having a water impermeable layer 32 affixed thereto. The water impremeable layer 32 preferably is also grease impermeable.

The water impermeable layer 32, as shown in FIG. 3, consists of a uniform single layer, but it is to be understood that multiple layers of different materials are contemplated as within the scope of the present invention. In containers which are to be used to cook nongreasy food at less than about 350° F. it is particularly preferred that the water impermeable layer comprise polyethylene. The polyethylene may be coated onto the paperboard substrate 31 in any suitable manner, e.g., extrusion coating, at a thickness so that the coated paperboard blank may be deep drawn into a container. It is broadly preferred that the thickness of the affixed water impermeable coating 32 be about 1 to 5 mils thick and it is most preferred that the coating be about 1 to 1.15 mils thick.

If a container with better grease resistance is desired, the paperboard substrate 31 of the present invention may be coated first with polyethylene and then a polyester layer may be affixed to the polyethylene coated paperboard substrate. Again each coating may be applied in any suitable manner, e.g., extrusion coating, to the paperboard substrate. The combined coating thickness, as above, is preferably about 1 to 5 mils thick and most preferably is about 1 to 1.5 mils thick.

Yet another type of impermeable layer 32 is preferred when the containers of the present invention are to be employed at temperatures greater than 350° F. In this embodiment, first, aluminum foil is affixed to the paperboard substrate in any suitable manner, e.g. extrusion laminating, at a thickness preferably of about 0.00023 inch to 0.0010 inch. Then polyethylene is coated onto the aluminum coated paperboard substrate to obtain a paperboard blank with good heat resistance. Again the combined coating thickness is preferably about 1 to 5 mils thick and most preferably about 1 to 1½ mils thick, it being understood that all the above thickness are only preferred and not intended to limit the present invention.

While the water impermeable layer 32 has been described above in terms of specific embodiments, it is to be understood that any water impermeable layer which may be affixed to paperboard to provide a paperboard blank which may be subsequently deep drawn is contemplated as within the scope of the present invention. Other materials which may be employed in the present invention include polypropylene and polyamides.

When the containers of the present invention are filled with water at 70° F. and stored for 10 minutes at 70° F. substantially no water will permeate into the paperboard substrate. This is what is meant in the specification and claims by the term "water impermeable layer". Further, when bacon grease at 200° F is poured into the preferred containers of the present invention and allowed to solidify at an ambient temperature of about 70° F. substantially no bacon grease will permeate into the paperboard substrate. This is what is meant in the specification and claims by the term "grease impermeable layer".

The paperboard substrate 32 which is employed in the present invention is made from bleached virgin sulfate on sulphite pulp or mixtures thereof. The thickness of the paperboard is at least about 15 caliper and preferably is about 15 caliper to 30 caliper. The basis weight broadly is about 50 lbs/1000sq.ft. to 110 lbs/1000sq. ft. and preferably is about 52 lbs/1000sq. ft. to 108 lbs/1000 sq. ft. The tensile strength in the machine direction is about 70 to 190 lbs/in. and in the cross direction about 40 to 100 lbs/in. The Taber V-5 stiffness in the machine direction is about 100 to 780 Taber units and in the cross direction is about 50 to 390 Taber units. Additionally, for containers for food the finished board must conform wih all provisions of the Federal, Food, Drug and Cosmetic Art and Amendments thereto. As defined above, milk carton stock and some types of cup stock may be employed as the paperboard substrate 32 of the present invention.

Referring now to FIG. 4, there is shown schematically the relationship of male mandrel 41, paperboard blank 21, and female mold 42 prior to drawing the paperboard blank into the container 11 of the present invention. As shown in FIG. 4, the paperboard blank 21 is positioned between the male mandrel 41 and female mold 42 with the scored and coated side 25 of the paperboard blank 21 facing the male mandrel 41. The male mandrel 41 and female mold 42 are positioned so that the male mandrel 41 may engage the female mold 42 thereby drawing the blank into the female mold 42.

The male mandrel and female mold are, of course, designed to form a paperboard container with the dimensions described above.

The male mandrel 41 or female mold 42, or preferably both, are heated by any suitable means (not shown), e.g., a circular band or cartridge heater, so that the blank is exposed to a temperature of at least about 200° F. and preferably about 200° F. to 350° F. when it is in the female mold. The application of heat to the paperboard as described above sets the paperboard container so that it will return or "pop back" to its original flat state when it is removed from the mold.

After the container has been set in the molding apparatus the male mandrel 41 is disengaged from the female mold 42 and the finished container removed therefrom. In practice we contemplate producing the containers of the present invention by a continuous process operated at a fairly high speed, e.g., 40 strokes/minute.

We have discovered that when the paperboard blanks 21 of the present invention are coated with certain water impermeable substances the paperboard blank 21 has a tendency to stick to the male mandrel. When this occurs, the male mandrel improperly disengages from the set container thereby adversely affecting the finished containers. Further, in extreme situations, the water impermeable material will become caked onto the male mandrel to such an extent that the male mandrel's movement in the female mold will be adversely affected.

We have found that the sticking problem described above can be avoided by maintaining the temperature of the male mandrel 41 lower than the temperature of the female mold 42. For example, with polyethylene coated paperboard blanks the temperature of the male mandrel is maintained below about 195° F. while the temperature of the female mold is preferably maintained at between 200° F. to 350° F. By maintaining the temperatures at these levels we have found that the paperboard blank is exposed to a sufficiently high temperature to set the blank, but at the same time the paperboard blank does not stick to the male mandrel.

In the most preferred embodiment of the present invention, the male mandrel 41 and female mold 42 are chromium plated. The chromium plating serves to reduce the friction between the paperboard blank and the mold and mandrel thereby minimizing the possibility of tearing during the drawing operation.

By using the particular paperboard described above, there may be provided paperboard containers which could not otherwise be obtained. For instance, we have attempted to deep draw paperboard containers 1.375 inches deep, with a radius of curvature of ⅝ inch and an angle of inclination of about 17° using cylinder sheet and clay coated Fourdrinier sheet. However, we were not able to obtain suitable paperboard containers using these types of paperboard raw material. But, when we used the specific paperboard starting material of the present invention we were able to deep draw containers of the above dimensions.

It will be recalled that the paperboard blanks of the present invention may be circular. It will be appreciated that when circular blanks are employed, the containers which are drawn therefrom will be circular in configuration. It is to be understood that the terms "walls" and "corners" as used in the specification and claims encompass the single curved wall of such circular containers.

It will be understood that while the invention has been described with respect to preferred embodiments, variations may be perceived by those skilled in the art while nevertheless not departing from the scope of my invention as defined by the claims appended hereto.

We claim:

1. A deep drawn paperboard container for food comprising a coated paperboard substrate deep drawn into the shape of a container, said paperboard substrate comprising bleached virgin sulphate or sulphite pulp or mixtures thereof and having a thickness of at least about 15 caliper, a basis weight of about 50 lbs/1000sq. ft. to 110 lbs/1000 sq. ft.; a tensile strength of about 70 to 190 lbs/in. in the machine direction and about 40 to 100 lbs/in. in the cross direction, and a Taber V-5 stiffness of from about 100 to 780 Taber units in the machine direction and about 50 to 350 Taber units in the cross direction, said paperboard substrate having affixed thereto a water impermeable layer, said water impermeable layer forming the inside surface of said container, said container comprising a bottom and side walls with rounded corners, said rounded corners containing folded pleats, said container having a depth greater than about 1.375 inches, the rounded corners of the bottom having a radius of less than about ⅞ inch, and the angle of inclination of the side walls being less than about 20° from vertical.

2. The paperboard container of claim 1 wherein the rounded corners of the bottom have a radius of less than about 5/8 inch and the angle of inclination is less than about 17° from vertical.

3. The paperboard container of claim 1 wherein the paperboard substrate has a thickness of about 15 to 30 caliper and a basis weight of about 52 lbs/1000 sq. ft. to 108 lbs/1000 sq. ft.

4. The paperboard container of claim 1 wherein the impermeable layer has a thickness of about 1 to 5 mils.

5. The paperboard container of claim 1 wherein the impermeable layer is polyethylene.

6. The paperboard container of claim 1 wherein the impermeable layer is polyethylene coated onto aluminum foil.

7. The paperboard container of claim 1 wherein the impermeable layer is polyester coated onto polyethylene.

8. The method of deep drawing a container for food which comprises:
   a. providing a female mold;
   b. providing a male mandrel arranged and constructed so that it may engage the female mold;
   c. providing a paperboard blank, said blank having rounded corners and comprising a paperboard substrate with a water impermeable layer affixed thereto, said paperboard substrate having a thickness of at least about 15 caliper, a basis weight of about 50 lbs/1000 sq. ft. to 110 lbs/1000 sq. ft., a tensile strength of about 70 to 190 lbs/in. in the machine direction and about 40 to 100 lbs/in. in the cross direction, and a Taber V-5 stiffness of about 100 to 780 Taber units in the machine direction and about 40 to 100 lbs/in. in the cross direction, the rounded corners of said blank containing spaced radial score lines on the surface of the blank coated with said water impermeable layer;
   d. positioning said blank between said female mold and said male mandrel so that the scored surface coated with said impermeable layer faces said male mandrel;
   e. drawing said blank into said female mold by engaging said female mold with said male mandrel;
   f. exposing the drawn container while in said female mold to a temperature greater than about 200° F., said male mandrel, paperboard blank and female mold constructed so that a container with a depth greater than about 1.375 inches, rounded bottom corners of a radius of less than about 7/8 inch. and side walls with an angle of inclination of less than about 20° from vertical is thereby produced.

9. The method of claim 8 wherein the male mandrel and female mold are chromium plated.

10. The method of claim 8 wherein the temperature of the female mold is greater than the temperature of the male mold.

11. The method of claim 8 wherein the water impermeable layer is also grease impermeable.

12. The method of claim 8 wherein the water impermeable layer is polyethylene, the temperature of the male mandrel is less than about 195° F. and the temperature of the female mold is between about 200° and 350° F.

13. The method of claim 8 wherein the rounded bottom corners have a radius of less than about 5/8 inch and the side walls have an angle of inclination of less than about 17° from vertical.

14. The method of claim 8 wherein the paperboard substrate has a thickness of about 15 caliper to 30 caliper and a basis weight of about 52 lbs/1000 sq. ft. to 110 lbs/1000 sq. ft.

* * * * *

UNITED STATES PATENT AND TRADEMARK OFFICE
CERTIFICATE OF CORRECTION

PATENT NO. : 4,026,458

DATED : May 31, 1977

INVENTOR(S) : Jerald A. Morris, John C. Siegele

It is certified that error appears in the above-identified patent and that said Letters Patent are hereby corrected as shown below:

Column 3, line 8, "emobodi-" should be -- embodi- --;

Column 5, line 24, "wih" should be -- with --;

Column 5, line 51, -- not -- should appear after "will".

Signed and Sealed this

Twentieth Day of September 1977

[SEAL]

Attest:

RUTH C. MASON
Attesting Officer

LUTRELLE F. PARKER
Acting Commissioner of Patents and Trademarks